(12) United States Patent
Chien

(10) Patent No.: US 12,114,279 B2
(45) Date of Patent: Oct. 8, 2024

(54) USER EQUIPMENT, BASE STATION, AND METHOD FOR TIME SYNCHRONIZATION

(71) Applicant: Purplevine Innovation Company Limited, Hong Kong (CN)

(72) Inventor: Chun-Che Chien, Hong Kong (CN)

(73) Assignee: Purplevine Innovation Company Limited, Hong Kong (CN)

( * ) Notice: Subject to any disclaimer, the term of this patent is extended or adjusted under 35 U.S.C. 154(b) by 372 days.

(21) Appl. No.: 17/618,629

(22) PCT Filed: May 14, 2021

(86) PCT No.: PCT/CN2021/093892
§ 371 (c)(1),
(2) Date: Dec. 13, 2021

(87) PCT Pub. No.: WO2021/228241
PCT Pub. Date: Nov. 18, 2021

(65) Prior Publication Data
US 2022/0240205 A1 Jul. 28, 2022

Related U.S. Application Data

(60) Provisional application No. 63/025,374, filed on May 15, 2020.

(51) Int. Cl.
*H04W 56/00* (2009.01)
*H04L 5/00* (2006.01)
(Continued)

(52) U.S. Cl.
CPC ....... *H04W 56/0015* (2013.01); *H04L 5/0051* (2013.01); *H04W 16/28* (2013.01);
(Continued)

(58) Field of Classification Search
CPC ............ H04W 56/0015; H04W 16/28; H04W 56/001; H04W 56/004; H04W 56/0055; H04W 74/0833; H04W 72/231
See application file for complete search history.

(56) References Cited

U.S. PATENT DOCUMENTS

8,089,938 B2 * 1/2012 Bosch ................ H04W 56/009
370/332
9,648,576 B2 5/2017 Gaal et al.
(Continued)

FOREIGN PATENT DOCUMENTS

| CN | 101347031 | 1/2009 |
|----|-----------|--------|
| CN | 102342049 | 2/2012 |

(Continued)

OTHER PUBLICATIONS

International Search Report and the Written Opinion Dated Jul. 30, 2021 From the International Searching Authority Re. Application No. PCT/CN2021/093892. (7 Pages).

*Primary Examiner* — Charles C Jiang
*Assistant Examiner* — Rachel Elizabeth Marks

(57) ABSTRACT

A user equipment (UE) executes a time synchronization method. The UE transmits a synchronization-specific uplink signal and receives a synchronization-specific downlink signal in response to the synchronization-specific uplink signal. The synchronization-specific uplink signal may comprise a dedicated preamble for propagation-delay-related signaling associated with at least one of timing advance (TA), propagation delay (PD), and propagation delay compensation (PDC) between the UE and a serving base station of the UE.

51 Claims, 10 Drawing Sheets

(51) Int. Cl.
*H04W 16/28* (2009.01)
*H04W 74/0833* (2024.01)

(52) U.S. Cl.
CPC ....... *H04W 56/001* (2013.01); *H04W 56/004* (2013.01); *H04W 56/0055* (2013.01); *H04W 74/0833* (2013.01)

(56) References Cited

U.S. PATENT DOCUMENTS

| | | |
|---|---|---|
| 10,244,499 B2 | 3/2019 | Rune et al. |
| 11,050,599 B2 | 6/2021 | Zhang et al. |
| 2018/0242268 A1* | 8/2018 | Rune ................. H04W 56/0015 |
| 2020/0107283 A1* | 4/2020 | Ratasuk ............. H04L 27/2646 |
| 2021/0352711 A1* | 11/2021 | Wu ..................... H04W 74/006 |
| 2022/0086786 A1* | 3/2022 | Narasimha ........ H04W 56/0005 |
| 2023/0171725 A1* | 6/2023 | Singh ................ H04W 56/0045 370/350 |
| 2023/0217386 A1* | 7/2023 | Orsino ............. H04W 56/0015 370/503 |

FOREIGN PATENT DOCUMENTS

| | | | |
|---|---|---|---|
| CN | 109792608 | 5/2019 | |
| CN | 109891957 | 6/2019 | |
| WO | WO 2019/126052 | 6/2019 | |
| WO | WO-2020167013 A1 * | 8/2020 | ............ H04J 3/0638 |
| WO | WO-2022085772 A1 * | 4/2022 | ........ H04W 56/0045 |

* cited by examiner

USER EQUIPMENT, BASE STATION, AND METHOD FOR TIME SYNCHRONIZATION

RELATED APPLICATIONS

This application is a National Phase of PCT Patent Application No. PCT/CN2021/093892 having International filing date of May 14, 2021, which claims the benefit of priority under 35 USC § 119(e) of U.S. Provisional Patent Application No. 63/025,374 filed on May 15, 2020. The contents of the above applications are all incorporated by reference as if fully set forth herein in their entirety.

FIELD AND BACKGROUND OF THE INVENTION

The present disclosure relates to the field of communication systems, and more particularly, to a user equipment, a base station, and method for time synchronization.

Wireless communication systems, such as the third-generation (3G) of mobile telephone standards and technology are well known. Such 3G standards and technology have been developed by the Third Generation Partnership Project (3GPP). The 3rd generation of wireless communications has generally been developed to support macro-cell mobile phone communications. Communication systems and networks have developed towards being a broadband and mobile system. In cellular wireless communication systems, user equipment (UE) is connected by a wireless link to a radio access network (RAN). The RAN comprises a set of base stations (BSs) that provide wireless links to the UEs located in cells covered by the base station, and an interface to a core network (CN) which provides overall network control. As will be appreciated the RAN and CN each conduct respective functions in relation to the overall network. The 3rd Generation Partnership Project has developed the so-called Long Term Evolution (LTE) system, namely, an Evolved Universal Mobile Telecommunication System Territorial Radio Access Network, (EUTRAN), for a mobile access network where one or more macro-cells are supported by a base station known as an eNodeB or eNB (evolved NodeB). More recently, LTE is evolving further towards the so-called 5G or NR (new radio) systems where one or more cells are supported by a base station known as a gNB.

Time sensitive communication (TSC), as defined in the technical specification (TS) 23.501 is a communication service that provides high reliability and availability to support deterministic communication with critical timing requirements, such as isochronous communication. Some examples of such services are cyber-physical control applications as described in TS 22.104 in the area of industrial internet of things (IoT).

According to 3GPP standard Release 16, to support strict synchronization accuracy requirements of TSC applications, a gNB may signal 5G system reference time information (RTI) to a UE using unicast or broadcast radio resource control (RRC) signaling with a granularity of 10 nanoseconds (ns). An uncertainty parameter may be included in reference time information to indicate RTI accuracy.

Propagation delay is a travel time of a frame transmitted between a UE and a gNB, and may be calculated based on a timing advance (TA) value after performing downlink synchronization by decoding the PSS and SSS signal and the uplink PRACH preamble transmission. Time synchronization between a UE and a gNB makes an internal clock of the UE as identical as possible to an internal clock of the gNB based on the reference time information (RTI) provided by the BS and the propagation delay. Propagation delay should be compensated with respect to RTI to meet high synchronization accuracy requirements.

SUMMARY OF THE INVENTION

An object of the present disclosure is to propose a user equipment, a base station, and method for time synchronization.

In a first aspect, an embodiment of the invention provides a time synchronization method executable in a user equipment (UE), comprising:
transmitting a synchronization-specific uplink signal; and
receiving a synchronization-specific downlink signal. The synchronization-specific uplink or downlink signal can be different to the traditional uplink or downlink signal used for timing advance acquisition.

In a second aspect, an embodiment of the invention provides a user equipment (UE) comprising a transceiver and a processor. The processor is connected to the transceiver and configured to execute the following steps: transmitting a synchronization-specific uplink signal; and
receiving a synchronization-specific downlink signal.

In a third aspect, an embodiment of the invention provides a time synchronization method executable in a base station, comprising:
receiving a synchronization-specific uplink signal; and
transmitting a synchronization-specific downlink signal in response to the synchronization-specific uplink signal.

In a fourth aspect, an embodiment of the invention provides a base station comprising a transceiver and a processor. The processor is connected to the transceiver and configured to execute the following steps:
receiving a synchronization-specific uplink signal: and
transmitting a synchronization-specific downlink signal in response to the synchronization-specific uplink signal.

The disclosed method may be implemented in a chip. The chip may include a processor, configured to call and run a computer program stored in a memory, to cause a device in which the chip is installed to execute the disclosed method.

The disclosed method may be programmed as computer executable instructions stored in non-transitory computer readable medium. The non-transitory computer readable medium, when loaded to a computer, directs a processor of the computer to execute the disclosed method.

The non-transitory computer readable medium may comprise at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory.

The disclosed method may be programmed as a computer program product, that causes a computer to execute the disclosed method.

The disclosed method may be programmed as a computer program, that causes a computer to execute the disclosed method.

The disclosed method may enable synchronization in a target cell and enhance continuity of the synchronization service, even in high mobility environments. The disclosed method may facilitate synchronization in wide areas, such as large automobile assembly factories. The disclosed method provides synchronization in a scenario where a grant master clock is attached to one of a plurality of UEs, or a grant master clock is attached to a gNB. A UE with a grant master clock may be applied in a factory environment. An embodiment of the disclosed method allows updating of timing advance (TA) value, preference of TA adjustment accuracy, and preference of reference time information (RTI) accuracy.

BRIEF DESCRIPTION OF THE SEVERAL VIEWS OF THE DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field may obtain other figures according to these figures without paying the premise.

DESCRIPTION OF SPECIFIC EMBODIMENTS OF THE INVENTION

Embodiments of the disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

Figure 1:
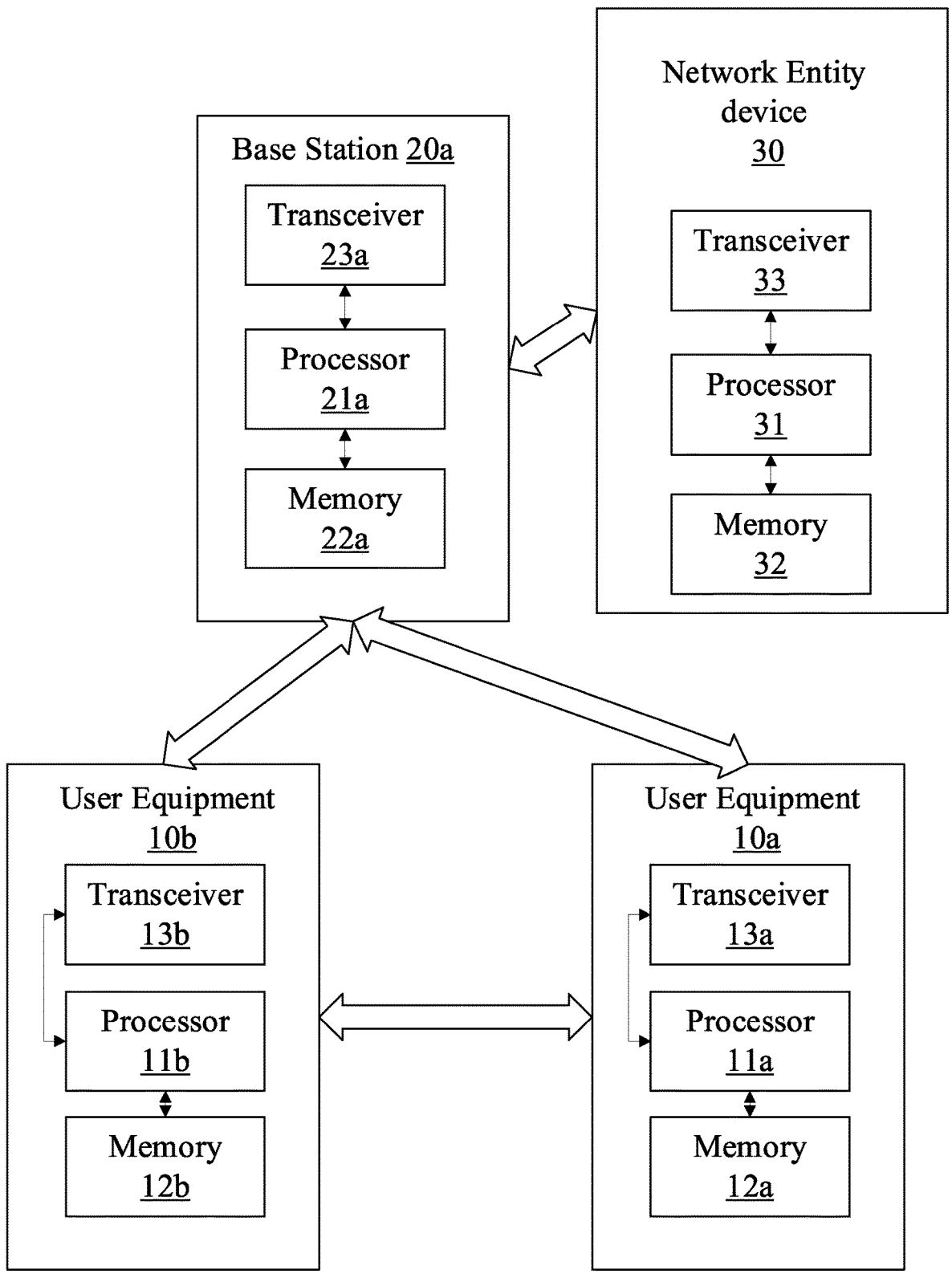
FIG. 1 illustrates a schematic view of a telecommunication system.

With reference to FIG. 1, a telecommunication system including a UE 10a, a UE 10b, a base station (BS) 20a, and a network entity device 30 executes the disclosed method according to an embodiment of the present disclosure. FIG. 1 is shown for illustrative not limiting, and the system may comprise more UEs. BSs, and CN entities. Connections between devices and device components are shown as lines and arrows in the FIGs. The UE 10a may include a processor 11a, a memory 12a, and a transceiver 13a. The UE 10b may include a processor 11b, a memory 12b, and a transceiver 13b. The base station 20a may include a processor 21a, a memory 22a, and a transceiver 23a. The network entity device 30 may include a processor 31, a memory 32, and a transceiver 33. Each of the processors 11a, 11b, 21a, and 31 may be configured to implement proposed functions, procedures and/or methods described in the description. Layers of radio interface protocol may be implemented in the processors 11a, 11b, 21a, and 31. Each of the memory 12a, 12b, 22a, and 32 operatively stores a variety of programs and information to operate a connected processor. Each of the transceivers 13a, 13b, 23a, and 33 is operatively coupled with a connected processor, transmits and/or receives radio signals or wireline signals. The UE 10a may be in communication with the UE 10b through a sidelink. The base station 20a may be an eNB, a gNB, or one of other types of radio nodes, and may configure radio resources for the UE 10a and UE 10b.

Each of the processors 11a, 11b, 21a, and 31 may include an application-specific integrated circuit (ASICs), other chipsets, logic circuits and/or data processing devices. Each of the memory 12a, 12b, 22a, and 32 may include read-only memory (ROM), a random access memory (RAM), a flash memory, a memory card, a storage medium and/or other storage devices. Each of the transceivers 13a, 13b, 23a, and 33 may include baseband circuitry and radio frequency (RF) circuitry to process radio frequency signals. When the embodiments are implemented in software, the techniques described herein may be implemented with modules, procedures, functions, entities, and so on, that perform the functions described herein. The modules may be stored in a memory and executed by the processors. The memory may be implemented within a processor or external to the processor, in which those may be communicatively coupled to the processor via various means are known in the art.

The network entity device 30 may be a node in a CN. CN may include LTE CN or 5G core (5GC) which includes user plane function (UPF), session management function (SMF), mobility management function (AMF), unified data management (UDM), policy control function (PCF), control plane (CP)/user plane (UP) separation (CUPS), authentication server (AUSF), network slice selection function (NSSF), and the network exposure function (NEF).

An example of the UE in the description may include one of the UE 10a or UE 10b. An example of the base station in the description may include the base station 20a. Uplink (UL) transmission of a control signal or data may be a transmission operation from a UE to a base station. Downlink (DL) transmission of a control signal or data may be a transmission operation from a base station to a UE.

To address the issues of uplink time synchronization, the invention provides a time synchronization method with flexible synchronization accuracy and propagation delay compensation with respect to received reference time information (RTI) under a large coverage range. The disclosed method may be applied to a UE in human to human (H2H) communication or a UE in machine to machine (M2M) or machine type communication (MTC), which may undergo frequent handover among gNBs in a larger operation area to meet synchronization accuracy requirements. The UE in MTC is referred to as a machine equipment (ME).

Based on an actual evaluation of time synchronization accuracy over Uu interface between a gNB and a single UE, a timing synchronization error between a gNB and a UE no worse than 540 nanoseconds (ns) is achievable. For small service areas with dense small cell deployments, compensation for propagation delay may not be needed. For larger areas with sparse cell deployments, e.g. a cell with a radius exceeding 200 meters, compensation for propagation delay is required. For moving robot or mobile machine equipment, the mobility issue must be involved in compensating for the delay of propagation.

When a TSN clock is located in a base station, such as a gNB, all UEs under coverage of the base station are synchronized with the TSN clock provided by the base station. However, for the case of an uplink synchronization scenario where a TSN clock is located in one of a plurality of UEs, a base station, such as a gNB, needs to receive the TSN clock from the UE and relay the TSN clock to other UEs to achieve UE-to-UE synchronization. In this case, maintaining synchronization accuracy is more challenging. Since two-hop synchronization may cause more synchronization error, propagation delay compensation is required to meet the synchronization accuracy requirement of 1 microsecond (us).

In an embodiment of the invention, a UE performs propagation delay compensation taking into account larger coverage and mobility issues while the TSN clock is located in the gNB as well as the scenario where the TSN clock is located in the UE. An embodiment of the invention provides an indication of compensation activation from a base station, such as a gNB. An embodiment of the invention allows a UE to transmit a conditional compensation request to a base station. An embodiment of the invention allows autonomous propagation delay compensation by a UE during handover. An embodiment of the invention allows RTI forwarding by a UE to extend clock synchronization domain. An embodiment of the invention allows a grant master clock in a UE, and the UE may provide clock information to serving base stations for uplink synchronization. In the description, propagation-delay-related value is a value of at least one of timing advance (TA), propagation delay (PD), and the specific value granularity is granularity of at least one of timing advance (TA), propagation delay (PD). Embodiments of the invention are provided in the following.

Embodiment 1

In an embodiment of the invention, either a UE or a base station performs propagation delay compensation or precompensation respectively with respect to RTI Embodiment 1-1

Figure 2:
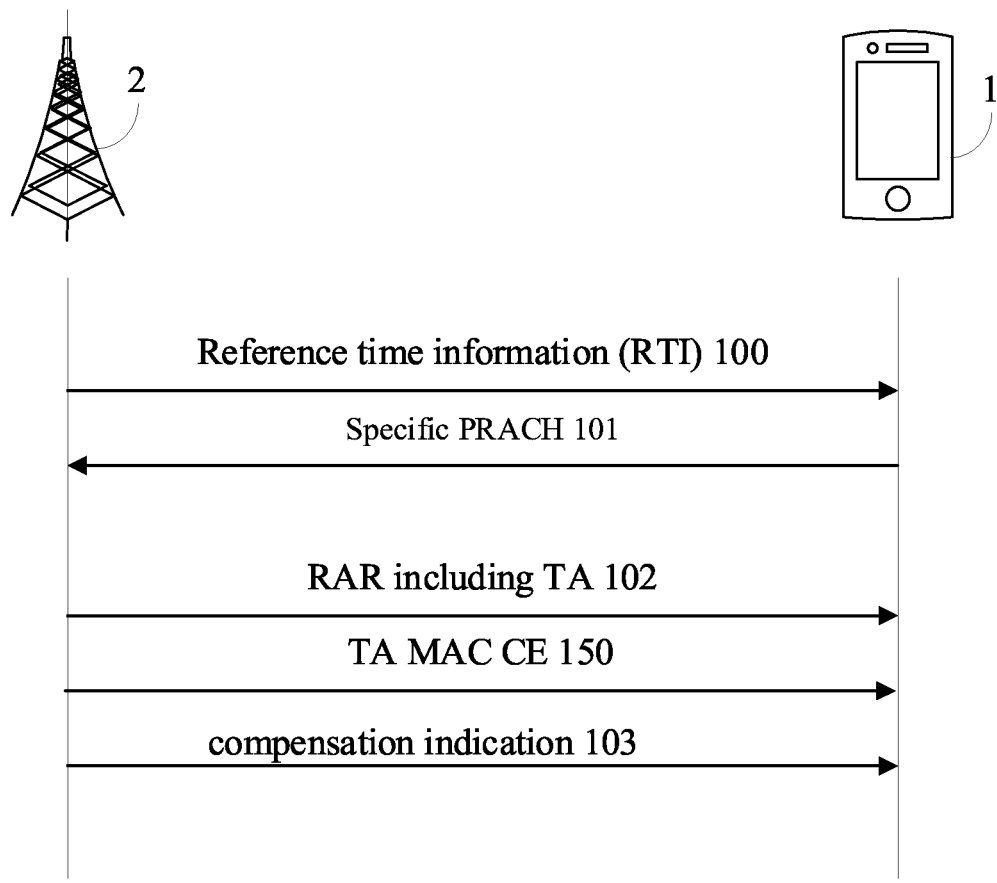
FIG. 2 illustrates a schematic view showing signaling between a UE and a base station using synchronization-specific random access channel signals.
Figure 3:
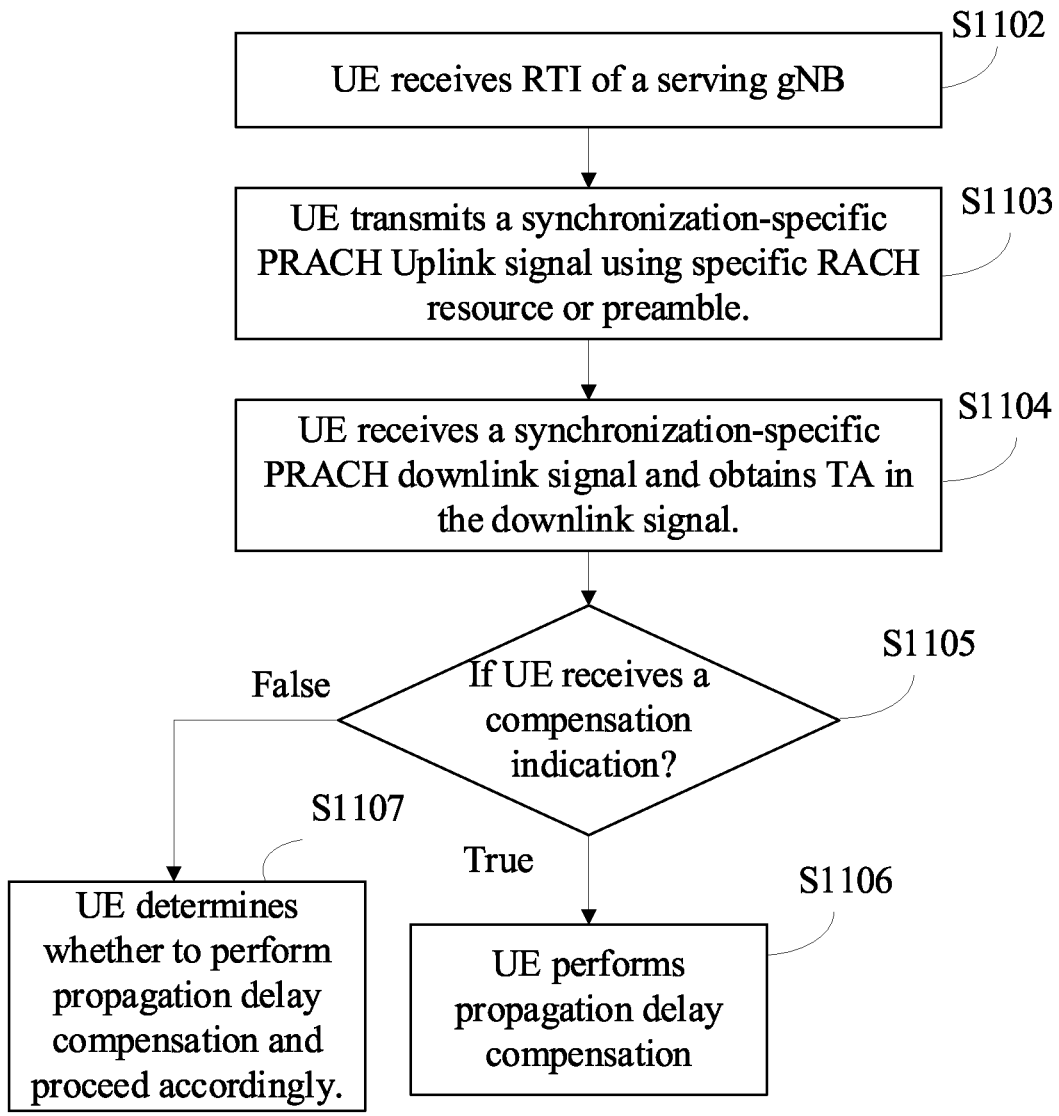
FIG. 3 illustrates a schematic view showing a time synchronization method according to an embodiment of the invention.

A UE derives propagation-delay-related value based on a synchronization-specific random-access channel (RACH) procedure and performs PD compensation. The UE may obtain a propagation delay from a TA value indicated by a base station in a synchronization-specific RACH downlink signal after transmitting synchronization-specific PRACH. The obtained propagation delay between gNB 2 and UE 1 may be approximately half of the indicated timing advance, that is TA/2. The synchronization-specific PRACH transmission is an embodiment of a synchronization-specific uplink signaling. With reference to FIG. 2 and FIG. 3, an embodiment of the invention is detailed in the following:

UE 1 receives reference time information (RTI) 100 from gNB 2 (step S1102) via a system information block (SIB), such as SIB9, or a unicast radio resource control (RRC) message, such as DLInformationTransfer message.

UE 1 derives a TA value of the corresponding serving gNB 2 via a synchronization-specific RACH procedure. In the synchronization-specific RACH procedure, the UE transmits a synchronization-specific PRACH 101 to the gNB 2 (step S1103). The synchronization-specific PRACH 101 is an embodiment of a synchronization-specific uplink signal and may be allocated dedicated RACH resources or a dedicated preamble which may be provided with less synchronization timing error. The synchronization-specific uplink signal comprises a dedicated preamble, a sounding reference signal (SRS), or an uplink DMRS signal for propagation-delay-related signaling, the propagation-delay-related signaling is associated with at least one of timing advance (TA) and propagation delay (PD) between the UE and a serving base station of the UE 1. The dedicated preamble, the sounding reference signal (SRS) or the uplink DMRS signal is transmitted based on a predetermined or previously acquired timing advance (TA) or propagation delay (PD). The dedicated preamble is used for a non-contention based RACH procedure during an RRC_CONNECTED state of the UE 1. The synchronization-specific uplink signal may comprise a request for provision or update of a propagation-delay-related value or reference time information (RTI), and the propagation-delay-related value comprises a value of at least one of timing advance (TA) and propagation delay (PD) The UE 1 may generate the synchronization-specific PRACH 101 using the following example schemes:

First scheme: The gNB 2 may allocate to the UE 1 dedicated RACH resources in PRACH for TA acquisition only, e.g., for acquisition of a random access response (RAR) message Msg2 with only a TA field. For example, the UE 1 may generate and transmit the synchronization-specific PRACH 101 as Msg1 in dedicated RACH resources to the gNB2.

Second scheme: The gNB 2 may allocate to the UE 1 dedicated preamble in PRACH for TA acquisition only, e.g., for acquisition of a random access response (RAR) message Msg2 with only a TA field. For example, the dedicated preamble is for non-contention based PRACH, and UE 1 may generate and transmit the synchronization-specific PRACH 101 as Msg1 with the dedicated RACH preamble to the gNB2. UE 1 receiving a synchronization-specific downlink signal in response to the synchronization-specific uplink signal in step S1104. The downlink signal comprises a type of timing advance (TA) associated with a source of reference time information (RTI) or associated with a time sensitive communication (TSC) traffic type. The synchronization-specific downlink signal may be transmitted in a random access response (RAR) or a medium access control (MAC) control element (CE). In an embodiment, the UE 1 receives a random-access response (RAR) 102 from the gNB 2 and obtains a value of a TA in the RAR 102 (step S1104). For example, the UE 1 may generate and transmit the synchronization-specific PRACH 101 as Msg1 in dedicated RACH resources to the gNB2, and receive the RAR Msg2 with only a TA field from the gNB 2 in response to the Msg1 without transmitting Msg3. Alternatively, the UE 1 may generate and transmit the TA-specific PRACH 101 as Msg1 with the dedicated RACH preamble to the gNB2, and receive the RAR Msg2 with only a TA field from the gNB 2 in response to the Msg1 without transmitting Msg3. Alternatively, to enhance timing synchronization accuracy, after the UE having acquired a previous timing advance value given by the gNB 2 may adjust transmission time of a sounding reference signal (SRS) using the previous timing advance value, and send the SRS to the gNB 2 on the adjusted transmission time. The gNB 2 receiving the SRS can measure the SRS sent from the UE during the RRC_CONNECTED state, refine timing advance calculation by generating a refined TA based on the SRS measurement, and send the refined TA to the UE 1 in a medium access control (MAC) control element (CE). The UE 1 receives a medium access control (MAC) control element (CE) 150 as a timing advance (TA) command from the gNB 2 and obtains a TA value in the MAC CE 150 in step S1104.

UE 1 may receive an indication of propagation delay compensation 103 from gNB 2 and determine whether to perform propagation delay compensation or not according to the indication of propagation delay compensation 103 (step S1105). The indication of propagation delay compensation 103 may be referred to as a UE-side propagation delay compensation indication carried in a downlink channel from the gNB 2 to the UE 1 using one of the following example schemes:

- First scheme: The UE-side propagation delay compensation indication may be located in a RAR, such as the RAR 102. For example, the UE-side propagation delay compensation indication may be jointly transmitted with the TA in the RAR 102.
- Second scheme: The UE-side propagation delay compensation indication may be located in a MAC CE. For example, the UE-side propagation delay compensation indication may be jointly transmitted with the TA in the MAC CE 150.
- Third scheme: The UE-side propagation delay compensation indication may be carried in RRC signaling, e.g., jointly transmitted with RTI in a broadcast RRC message, such as a SIB9 or another SIB, or a unicast RRC message, such as a DLInformationTransfer message.

UE 1 compensates propagation delay for the received reference time information based on the determination in step S1105 (step S1106).

When the UE-side propagation delay compensation indication is not available, the UE 1 may determine whether to perform propagation delay compensation or not based on a pre-determined rule, such as a PD compensation triggering condition stored in the UE 1 (step S1107). The UE 1 may further determine whether to perform the UE-side propagation delay compensation based on whether propagation delay pre-compensation has been performed by serving base station. Whether the propagation delay pre-compensation has been performed may be indicated by a propagation delay pre-compensation indication. The propagation delay pre-compensation indication is transmitted from the base station 2 to the UE 1 in a random access response (RAR), a system information block (SIB), a medium access control (MAC) control element (CE), or a radio resource control (RRC) signal.

Embodiment 1-2

A gNB may pre-compensates propagation delay based on received PRACH.

Figure 4:
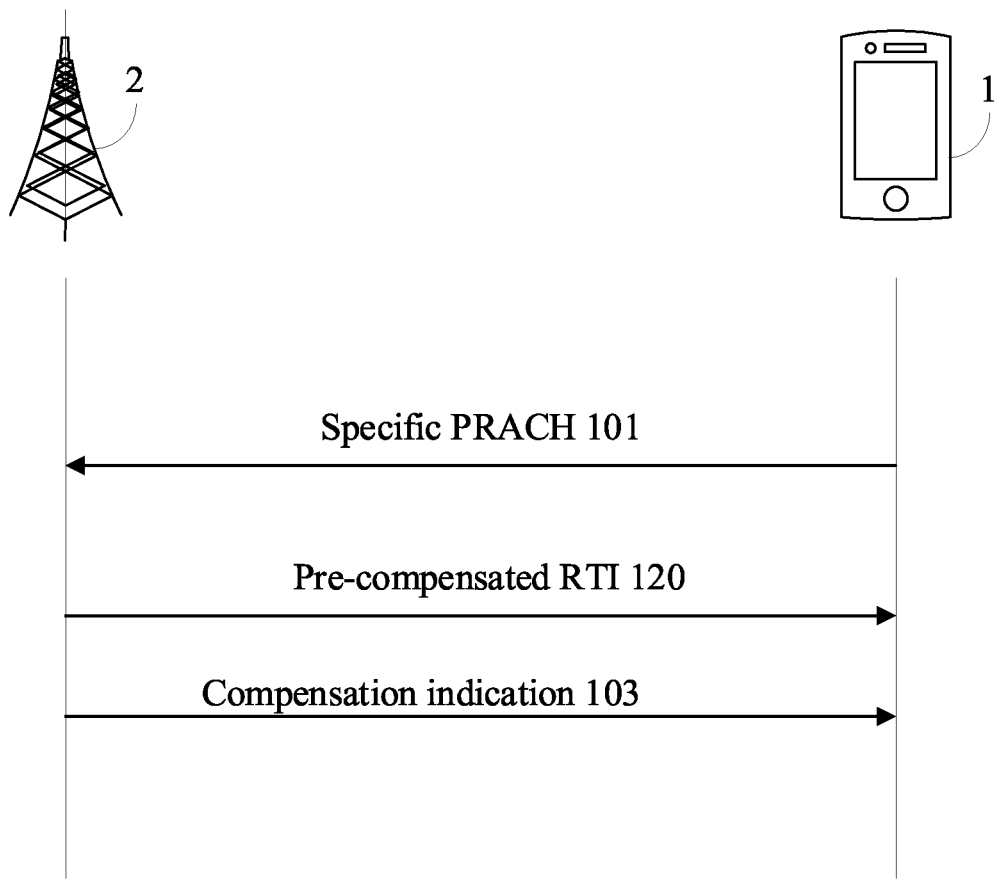
FIG. 4 illustrates a schematic view showing synchronization signaling between a UE and a base station including pre-compensated RTI and a compensation indication.
Figure 5:
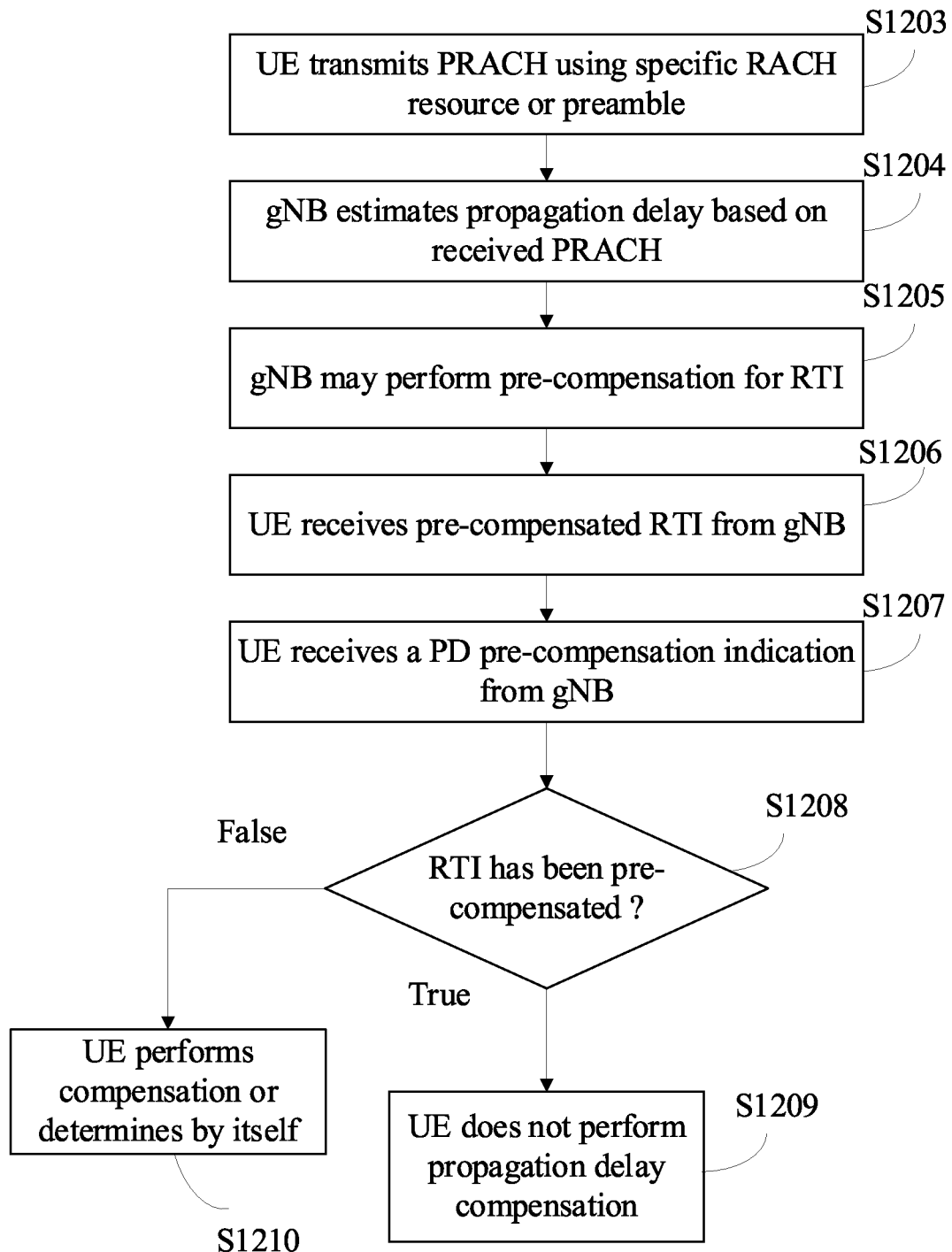
FIG. 5 illustrates a schematic view showing an embodiment of the time synchronization method using pre-compensated RTI and a compensation indication.

With reference to FIG. 4 and FIG. 5, the UE 1 may transmit a specific PRACH 101 as a TA request and/or a pre-compensation request (step S1203). The specific PRACH 101 is an embodiment of the synchronization-specific uplink signal and may be allocated dedicated RACH resources or a dedicated preamble. The UE 1 may generate the specific PRACH 101 using following example schemes.

- First scheme: The gNB 2 may allocate to the UE 1 dedicated RACH resources in PRACH for TA acquisition and/or pre-compensation request. e.g., for acquisition of a random access response (RAR) message Msg2 with only a TA field. For example, the UE 1 may generate and transmit the specific PRACH 101 as Msg1 in dedicated RACH resources to the gNB2.
- Second scheme: The gNB 2 may allocate to the UE 1 dedicated preamble in PRACH for TA acquisition and/or pre-compensation request, e.g., for acquisition of a random access response (RAR) message Msg2 with only a TA field. For example, the UE 1 may generate and transmit the specific PRACH 101 as Msg1 with the dedicated RACH preamble to the gNB2.

The gNB 2 derives TA value or propagation delay based on the received specific PRACH 101 (step S1204). Alternatively, the gNB 2 may also derive TA value based on the uplink reference signal transmitted from UE, e.g., a sounding reference signal (SRS) or demodulation reference signal (DMRS).

The gNB 2 pre-compensates the RTI according to the derived TA value (step S1205) and transmits pre-compensated RTI 120 to UE (step S1206). The UE 1 receives the pre-compensated RTI 120 from the gNB 2.

The UE 1 may receive an indication 103 of the pre-compensation from gNB 2 (step S1207), where indication 103 indicates whether the RTI has been pre-compensated or not (step S1208). The indication 103 of the pre-compensation may be referred to as a propagation delay pre-compensation indication carried in a synchronization-specific downlink signal using one of the following example locations:

- First scheme: The propagation delay pre-compensation indication may be located in a RAR, such as the RAR 102. For example, the propagation delay pre-compensation indication may be jointly transmitted with the TA in the RAR.
- Second scheme: The propagation delay pre-compensation indication may be located in a MAC CE. For example, the propagation delay pre-compensation indication may be jointly transmitted with the TA in the MAC CE.
- Third scheme: The propagation delay pre-compensation indication may be carried in RRC signaling, e.g., jointly transmitted with RTI in a broadcast RRC message, such as a SIB9 or another SIB, or a unicast RRC message, such as a DLInformationTransfer message.

The UE 1 determines whether the RTI has been pre-compensated or not using the propagation delay pre-compensation indication. When the RTI has been pre-compensated by gNB 2, the UE 1 does not perform propagation delay compensation (step S1209). When the RTI has not been pre-compensated by gNB 2, the UE may determine whether to compensate or not by itself based on certain conditions and perform propagation delay compensation accordingly (step S1210). For example, the UE 1 performs UE-side propagation delay compensation when the propagation delay pre-compensation has not been performed.

Embodiment 1-3

The gNB may provide pre-configured conditions that trigger PD compensation at the UE. The UE receives the pre-configured conditions and determines the necessity of performing propagation delay compensation based on pre-configured conditions. The pre-configured conditions may be referred to as PD compensation triggering conditions. The UE 1 may perform PD compensation in response to a PD compensation triggering event generated based on a PD compensation triggering condition. For example, the UE 1 may transmit the synchronization-specific uplink signal in response to a PD compensation triggering event generated based on a PD compensation triggering condition. The PD compensation triggering event may be an event that breaches the PD compensation triggering condition or meets the PD compensation triggering condition.

Figure 6:
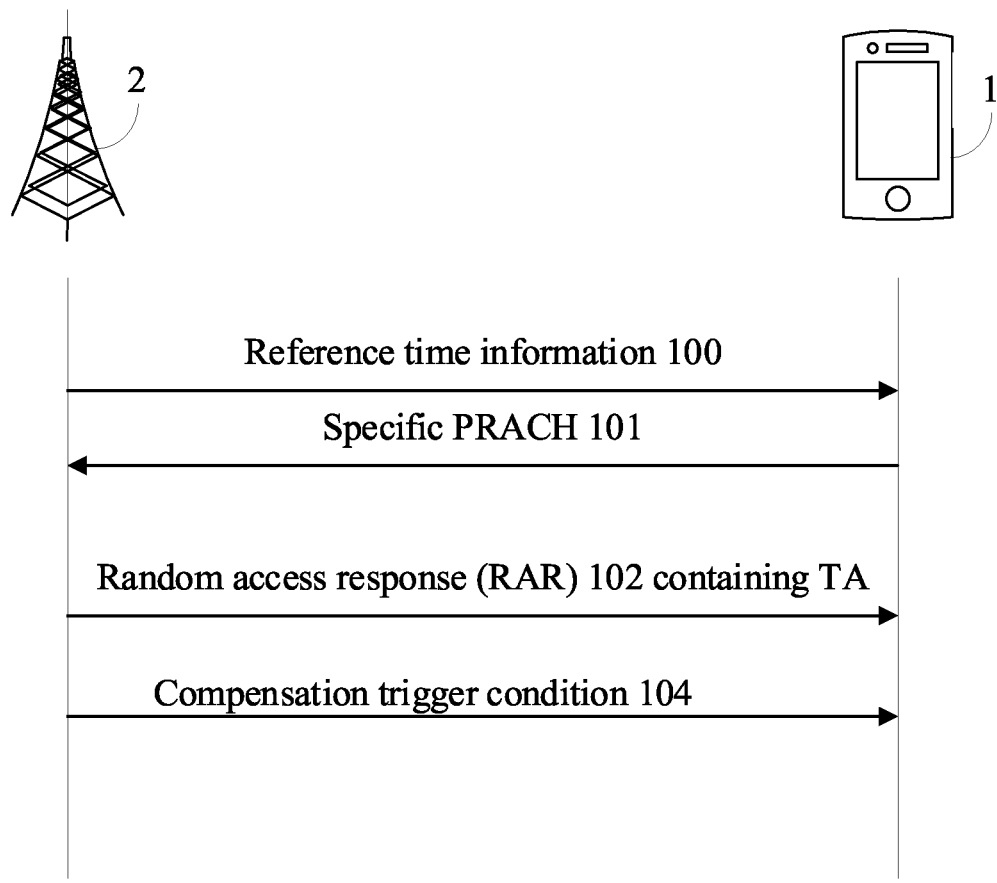
FIG. 6 illustrates a schematic view showing synchronization signaling between a UE and a base station including signaling of propagation delay (PD) compensation conditions.
Figure 7:
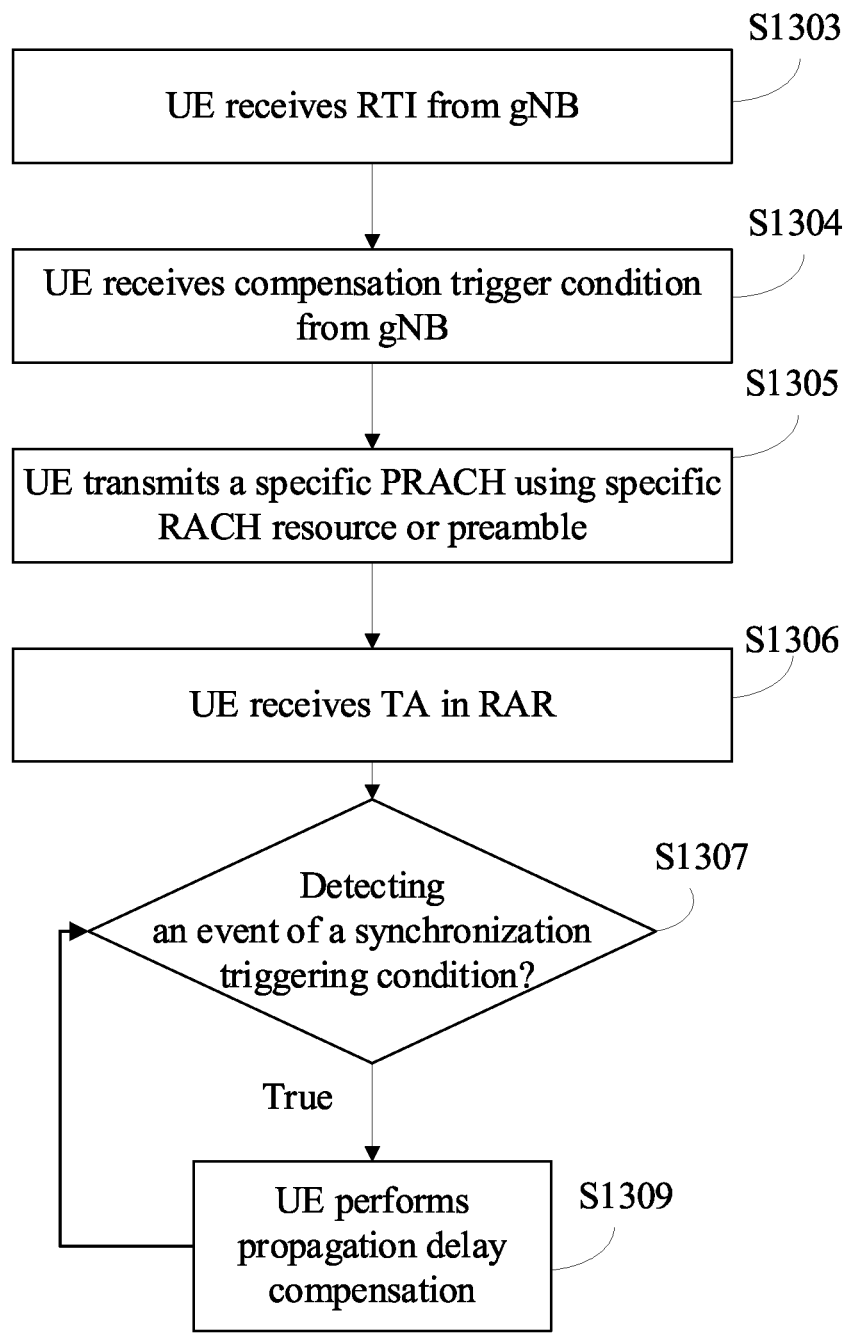
FIG. 7 illustrates a schematic view showing an embodiment of the time synchronization method performing PD compensation according to PD compensation conditions.

With reference to FIG. 6 and FIG. 7, the UE 1 receives RTI 100 from gNB 2 (step S1303). The gNB 2 may determine PD compensation triggering conditions that trigger PD compensation and send the conditions to the UE 1 to trigger PD compensation at the UE 1 based on the PD compensation triggering conditions. The UE 1 receives the PD compensation triggering conditions from the gNB 2 (step S1304). The following are examples of the conditions:

First scheme: One of the PD compensation triggering conditions indicate a range or a threshold of TA. The PD compensation triggering event may be an event that breaches the PD compensation triggering condition or meets the PD compensation triggering condition. For example, when the value of TA exceeds the range of TA value or is larger than a threshold, then the UE determines the propagation delay cannot be neglected and perform PD compensation in response to the event.

Second scheme: One of the PD compensation triggering conditions indicate a subcarrier spacing (SCS) value of the serving cell. The PD compensation triggering event may be an event that breaches the PD compensation triggering condition or meets the PD compensation triggering condition. For example, the propagation delay accumulates depends on SCS, and the larger SCS the larger the timing error. The UE 1 may perform PD compensation in response to an event representing SCS>30 KHz.

Third scheme: One of the PD compensation triggering conditions indicate a range or a threshold of received signal strength. The PD compensation triggering event may be an event that breaches the PD compensation triggering condition or meets the PD compensation triggering condition. For example, the received signal strength comprises reference symbol received power (RSRP), reference signal received quality (RSRQ), or reference signal resource indicator (RSRI) of synchronization signal block (SSB), CSI-RS, or DMRS. The UE 1 may perform PD compensation in response to an event representing the received signal strength less than the range or the threshold of the required signal strength due to long distance from the gNB 2.

Fourth scheme: One of the PD compensation triggering conditions indicate a geographic location, such as a GPS location, or a beam direction. The PD compensation triggering event may be an event that breaches the PD compensation triggering condition or meets the PD compensation triggering condition. For example, the UE 1 may perform PD compensation in response to an event representing a position of the UE 1 exceeding the range or the threshold of the geographic location. Alternatively, the UE 1 may perform PD compensation in response to an event that the UE 1 enters a range or a threshold of the geographic location.

gNB 2 may provide a PD compensation triggering condition to UE 104 via the following schemes:

First scheme: PD compensation triggering condition may be jointly transmitted with RTI in a broadcast RRC, such as SIB9 or another SIB, or a unicast RRC, such as a DLInformationTransfer message.

Second scheme: PD compensation triggering condition may be transmitted using a new broadcast or unicast RRC message. Thus, the UE 1 may receive the PD compensation triggering condition from a SIB, a MAC CE, or an RRC signal.

The UE 1 transmits a specific PRACH 101 to the gNB 2 (step S1305) and receives a RAR 102 containing a TA from the gNB 2 (step S1306). After deriving TA from the gNB 2, the UE 1 determines whether a PD compensation triggering event of one of the PD compensation triggering conditions is detected (step S1307). The UE 1 performs PD compensation according to the derived TA in response to a PD compensation triggering event that is generated based on a PD compensation triggering condition (step S1309). For example, the UE 1 performs PD compensation according to the derived TA when at least one of the conditions received from gNB 2 is satisfied.

Embodiment 1-4

During UE mobility, the propagation delay may change with the location of the UE 1, and the TA value is determined based on the location of the UE 1 or a relative distance between the UE 1 and the gNB 2. To ensure the previously derived TA value is still valid, the UE 1 may determine the validity of the TA value for propagation delay compensation based on the following conditions given by the gNB 2.

Figure 8:
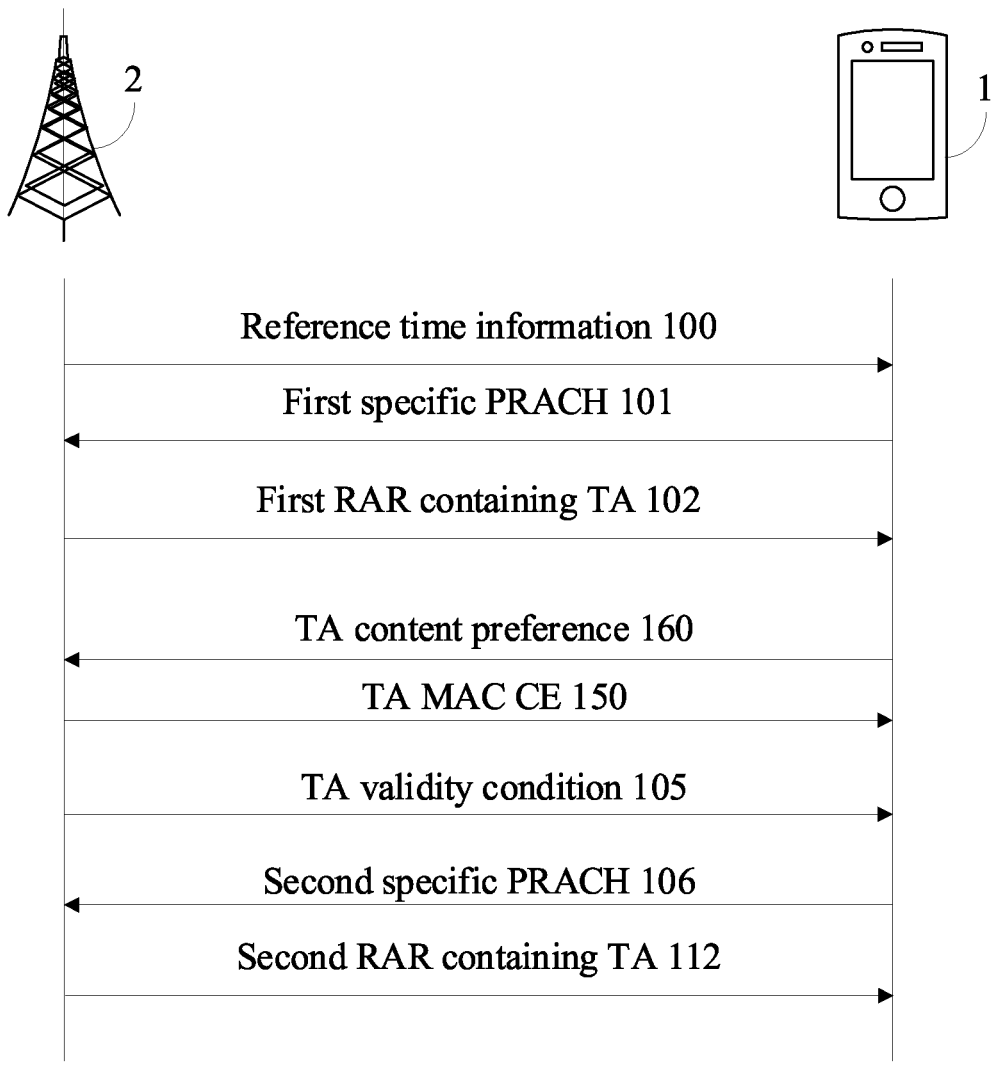
FIG. 8 illustrates a schematic view showing synchronization signaling between a UE and a base station including signaling of timing advance (TA) validity conditions and TA update requests.
Figure 9:
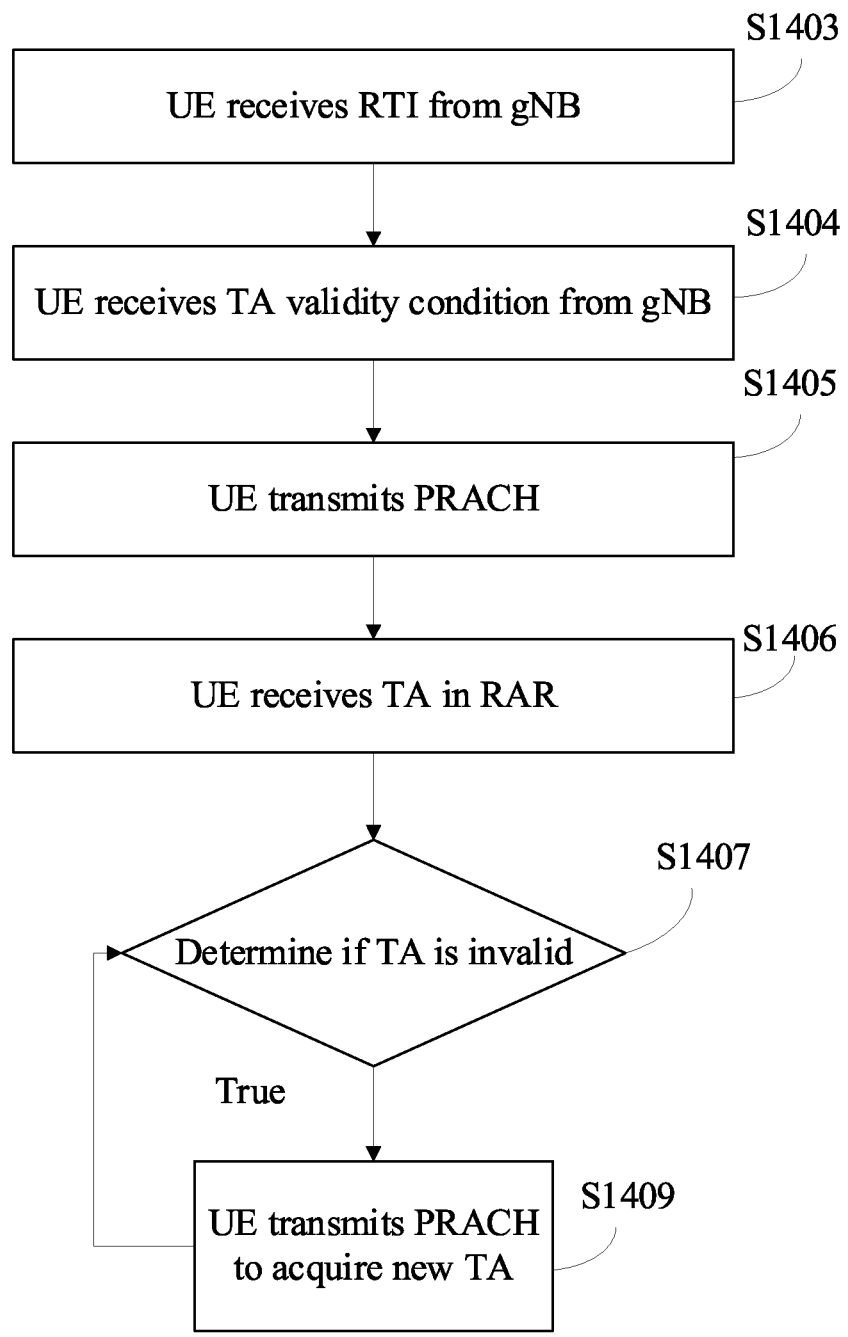
FIG. 9 illustrates a schematic view showing an embodiment of the time synchronization method for requesting TA update according to TA validity conditions.

With reference to FIG. 8 and FIG. 9, after receiving RTI 100 from gNB 2 (step S1403), the UE 1 receives one or more TA validity conditions 105 from the gNB 2 (step S1404). The UE 1 transmits a specific PRACH 101 to the gNB 2 as a request for TA (step S1405). The gNB 2 transmits a RAR 102 with the requested TA to the UE 1 in response to the specific PRACH 101. The UE 1 receives the RAR 102 and obtains the TA in the RAR 102 (step S1406). The gNB 2 may thus provide the TA validity conditions 105 that trigger UE 1 to determine the validity of TA for propagation delay compensation (step S1407). The UE 1 may determine the validity of TA for propagation delay compensation based on the TA validity conditions 105. Examples of the TA validity conditions 105 comprise:

First scheme: A TA validity condition may comprise a location of the UE 1. The TA validity event may be an event that breaches the TA validity condition or meets the TA validity condition. For example, the TA validity condition indicates a range or a threshold of the location of the UE 1. A TA validity event of the TA validity condition may be a change of the location of the UE 1 relative to the serving gNB 2 which exceeds the range or the threshold of the location of the UE1.

Second scheme: A TA validity condition may comprise a beam direction. The TA validity event may be an event that breaches the TA validity condition or meets the TA validity condition. For example, the TA validity condition indicates a range or a threshold of a beam direction of the gNB 2. A TA validity event of the TA validity condition may be a change of a beam from the gNB 2 to the UE 1, which exceeds the range or the threshold of the beam direction.

Third scheme: A TA validity condition may comprise received signal strength, such as RSRP, RSRQ, or RSRI, from the gNB 2. The TA validity event may be an event that breaches the TA validity condition or meets the TA validity condition. For example, the TA validity condition indicates a range or a threshold of the received signal strength from the gNB 2. A TA validity event of the TA validity condition may be an event representing the received signal strength exceeding the range or the threshold of the signal strength. For example, a TA validity event of the TA validity condition may be an event representing (SrxlevRef−current Srxlev)<SsearchdeltaP. Where:

Srxlev is the current Cell selection RX level value of the serving cell (dB).

$Srxlev_{Ref}$ is the reference Srxlev value of the serving cell (dB).

$S_{searchdeltaP}$ is the Srxlev delta threshold (in dB) during relaxed monitoring.

Fourth scheme: A TA validity condition may comprise a predetermined period of time kept by a PD compensation timer. A TA validity event of the TA validity condition may be an event representing an expiration of the PD compensation timer. The UE 1 may set up the compensation timer and restart the timer whenever receiving a TA after a RACH procedure. The predetermined period of time comprises a time duration of a discontinuous reception (DRX) cycle.

The UE 1 may determine the TA is invalid or outdated based on a TA validity event of one of the TA validity conditions. The UE 1 may transmit a second TA-specific PRACH 106 to request a new TA value and/or the propagation delay pre-compensation indication in response to a TA validity event of one of the TA validity conditions (step S1409). The second TA-specific PRACH 106 is another synchronization-specific uplink signal the UE 1 transmits in response to a TA validity event generated based on a TA validity condition. The another synchronization-specific uplink signal comprises a dedicated preamble, a sounding reference signal (SRS) or an uplink DMRS signal for propagation-delay-related signaling, and is transmitted based on a predetermined or previously acquired timing advance (TA) or propagation delay (PD). The TA validity condition is predefined in the UE 1 or received by the UE 1 in a system information block (SIB), a medium access control (MAC) control element (CE), or a radio resource control (RRC) signal from the gNB 2.

The UE 1 may use a TA preference indication uplink message, such as a MAC CE or an RRC message, to indicate TA content preference 160 associated with TA to be requested by UE, and send the TA preference indication uplink message to the gNB 2. For example, the TA preference indication uplink message may comprise accuracy of TA, the precision of TA, such as the granularity of TA, a type of TA associated with a selected source of RTI or a selected traffic type. The second TA-specific PRACH 106 is a request to indicate or update the granularity of the TA or the propagation delay:

In response to the second TA-specific PRACH 106, the gNB 2 may report a second RAR 112 with a new TA to the UE 1 using different granularities based on the TA content preference 160 received from the UE 1 or a synchronization requirement of a time sensitive communication (TSC) traffic. For example, the TSC traffic synchronization requirement may be obtained from TSC assistance information given by a TSC server via the core network. The second RAR 112 is an embodiment of the synchronization-specific random access channel downlink signal which comprises a propagation-delay-related value of a specific value granularity. The specific value granularity is one of a plurality of propagation-delay-related value granularities supported by the UE 1. The propagation-delay-related value is a value of at least one of timing advance (TA), propagation delay (PD), and propagation delay compensation (PDC), and the specific value granularity is the granularity of at least one of timing advance (TA), propagation delay (PD), and propagation delay compensation (PDC). The specific value granularity is selected from the plurality of propagation-delay-related value granularities based on TA content preference received from the UE 1 or based on a TSC traffic synchronization requirement. The UE 1 sends a request to indicate or update the granularity of the propagation-delay-related value, such as TA or the propagation delay. The gNB 2 provides to the UE 1 an update of the propagation-delay-related value with updated granularity in response to a request for indicating the updated granularity of the propagation-delay-related value.

Embodiment 1-5

For preventing overhead of transmitting request messages for propagation-delay-related values, such as RTI and TA, from UEs, the gNB 2 may perform periodic reporting of RTI or TA.

Figure 10:
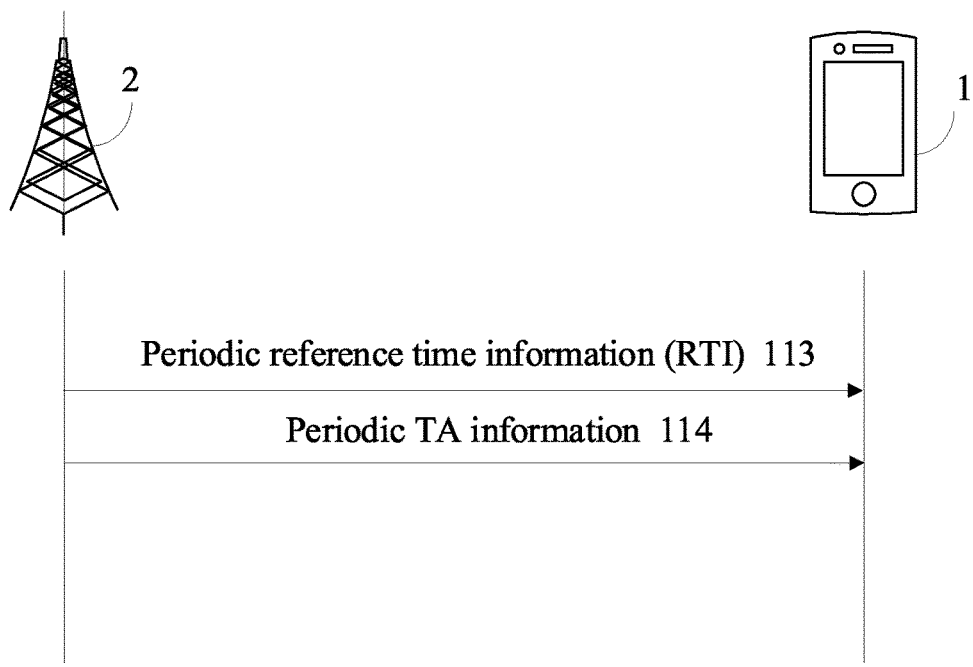
FIG. 10 illustrates a schematic view showing periodic RTI delivery from a base station to a UE.

With reference to FIG. 10, the gNB 2 may perform periodic reporting of RTI and/or TA to UEs, including the UE 1, without UE request. For example, the gNB 2 periodically transmits propagation-delay-related values, such as RTI 113 and/or TA 114 to the UE 1 based on a timer or configured grant configuration. The gNB 2 may periodically set up a timer and transmit RTI or TA in an RRC message upon expiration of the timer. The gNB 2 may periodically transmit RTI or TA through periodic DL transmission using semi-persistent scheduling (SPS). The gNB 2 can determine the periodicity of the periodic reporting based on UEAssistanceInformation message from the UE 1.

The UE 1 may send a request message to the gNB 2 for an update of RTI preference when necessary. Embodiments of the update of RTI preference are detailed in the following:

In an embodiment of the invention, the UE 1 may send a request to the gNB 2 for a single shot RTI delivery via a unicast RRC message in addition to the periodic transmission of RTI. The gNB 2 may receive the request for single-shot RTI delivery and send a message of RTI to the UE 1 as a single shot RTI in response to the request.

In an embodiment of the invention, the UE 1 may send a request to the gNB 2 to indicate or update granularity or uncertainty level of RTI that may be subsequently sent from the gNB 2 to the UE 1. The gNB 2 may receive the request indicating or updating the granularity of the RTI and send a message of RTI with the granularity or uncertainty level to the UE 1 in response to the request.

In an embodiment of the invention, the UE 1 may send a request to the gNB 2 to indicate or update periodicity of RTI delivery or TA delivery, that is, periodicity of the periodic reporting of RTI and/or TA. The gNB 2 may receive the request indicating or updating the periodicity and send a message of RTI or TA with the periodicity to the UE 1 in response to the request.

In an embodiment of the invention, the UE 1 may send a request to the gNB 2 to indicate or update an RTI type of a corresponding traffic type so that the gNB 2 transmits RTI of the indicated RTI type to the UE 1. The gNB 2 may receive the request indicating or updating the RTI type and send a message of RTI of the RTI type to the UE 1 in response to the request.

Propagation delay is a travel time of a frame transmitted between a UE and a gNB, and may be calculated based on a timing advance (TA) value after the UE 1 performs downlink synchronization by decoding a primary synchronization signal (PSS) and a secondary synchronization signal (SSS) and transmitting the uplink PRACH preamble transmission. The gNB 2 may transmit a downlink synchronization signal block (SSB), DMRS, or CSI-RS to the UE 1 as a downlink synchronization signal for the downlink synchronization. The UE 1 may transmit a request to indicate or to update the periodicity of the downlink synchronization signal, such as a downlink synchronization signal block (SSB). DMRS, or CSI-RS, to the gNB 2. The gNB 2 receives the request for indicating or updating the periodicity or location of downlink synchronization signals sent from the UE 1, and provides downlink synchronization signals with the periodicity in response to the request. An example of at least one of the downlink synchronization signals comprises downlink synchronization signal block (SSB). DMRS, or CSI-RS.

Figure 11:
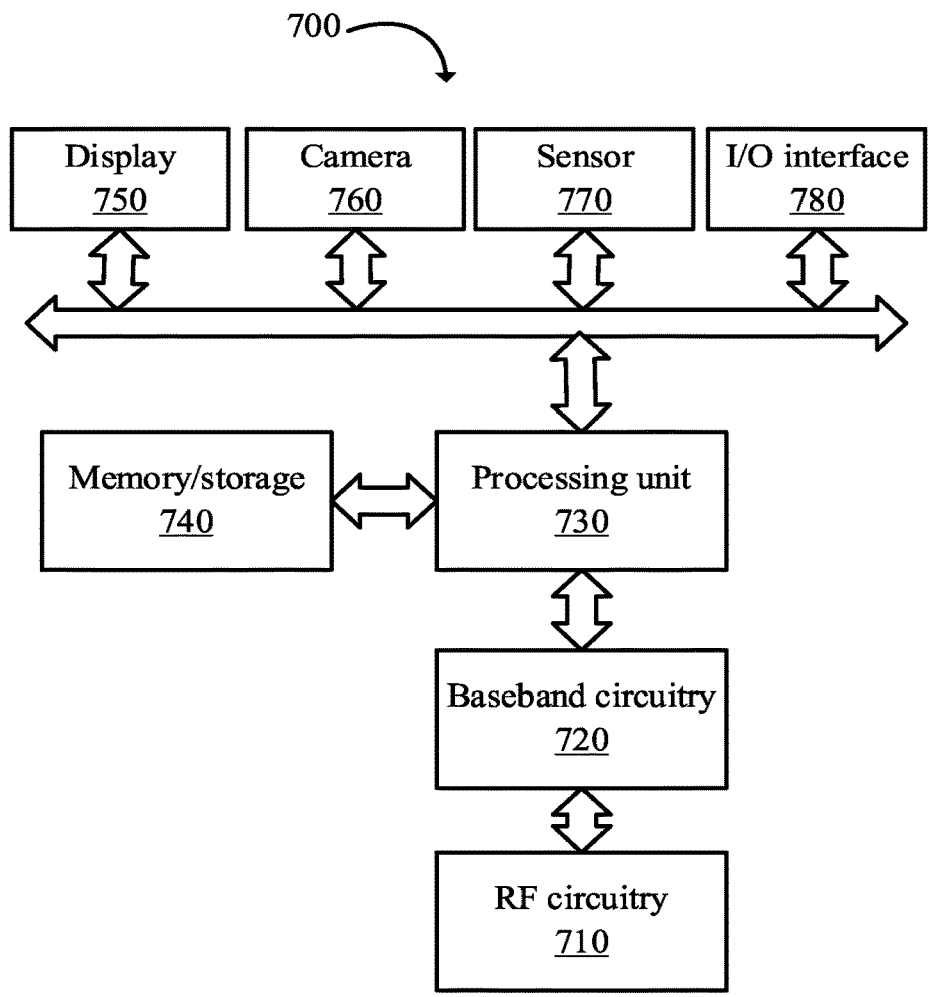
FIG. 11 illustrates a schematic view showing a system for wireless communication according to an embodiment of the present disclosure.

FIG. 11 is a block diagram of an example system 700 for wireless communication according to an embodiment of the present disclosure. Embodiments described herein may be implemented into the system using any suitably configured hardware and/or software. FIG. 11 illustrates the system 700 including a radio frequency (RF) circuitry 710, a baseband circuitry 720, a processing unit 730, a memory/storage 740, a display 750, a camera 760, a sensor 770, and an input/output (I/O) interface 780, coupled with each other as illustrated.

The processing unit 730 may include circuitry, such as, but not limited to, one or more single-core or multi-core processors. The processors may include any combinations of general-purpose processors and dedicated processors, such as graphics processors and application processors. The processors may be coupled with the memory/storage and configured to execute instructions stored in the memory/storage to enable various applications and/or operating systems running on the system.

The baseband circuitry 720 may include circuitry, such as, but not limited to, one or more single-core or multi-core processors. The processors may include a baseband processor. The baseband circuitry may handle various radio control functions that enable communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with 5G NR, LTE, an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry. In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency.

The RF circuitry 710 may enable communication with wireless networks using modulated electromagnetic radiation through a non-solid medium. In various embodiments, the RF circuitry may include switches, filters, amplifiers, etc. to facilitate communication with the wireless network. In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the UE, eNB, or gNB may be embodied in whole or in part in one or more of the RF circuitries, the baseband circuitry, and/or the processing unit. As used herein, "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules. In some embodiments, some or ail of the constituent components of the baseband circuitry, the processing unit, and/or the memory/storage may be implemented together on a system on a chip (SOC).

The memory/storage 740 may be used to load and store data and/or instructions, for example, for the system. The memory/storage for one embodiment may include any combination of suitable volatile memory, such as dynamic random access memory (DRAM)), and/or non-volatile memory, such as flash memory. In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network. e.g., a global positioning system (GPS) satellite. In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, etc. In various embodiments, the system may have more or less components, and/or different architectures. Where appropriate, the methods described herein may be implemented as a computer program. The computer program may be stored on a storage medium, such as a non-transitory storage medium.

The embodiment of the present disclosure is a combination of techniques/processes that may be adopted in 3GPP specification to create an end product.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of the application and design requirement for a technical plan. A person having ordinary skill in the art may use different ways to realize the function for each specific application while such realizations should not go beyond the scope of the present disclosure. It is understood by a person having ordinary skill in the art that he/she may refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure may be realized in other ways. The above-mentioned embodiments are exemplary only. The division of the units is merely based on logical functions while other divisions exist in realization. It is possible that a plurality of units or components are combined or integrated into another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments may be integrated into one processing unit, physically independent, or integrated into one processing unit with two or more than two units.

If the software function unit is realized and used and sold as a product, it may be stored in a readable storage medium in a computer. Based on this understanding, the technical plan proposed by the present disclosure may be essentially or partially realized as the form of a software product. Or, one part of the technical plan beneficial to the conventional technology may be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

The disclosed method may enable synchronization in a target cell and enhance continuity of the synchronization service, even in high mobility environments. The disclosed method may facilitate synchronization in wide areas, such as large automobile assembly factories. The disclosed method provides synchronization in a scenario where a grant master clock is attached to one of a plurality of UEs. A UE with a grant master clock may be applied in a factory environment. An embodiment of the disclosed method allows updating of timing advance (TA), preference of TA, and preference of reference time information (RTI).

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A time synchronization method executable in a user equipment (UE), comprising:
transmitting a synchronization-specific uplink signal, wherein the synchronization-specific uplink signal comprises a preamble for propagation-delay-related signaling, the propagation-delay-related signaling is associated with timing advance (TA) between the UE and a serving base station of the UE;
receiving a synchronization-specific downlink signal in response to the synchronization-specific uplink signal;
receiving a UE-side propagation delay compensation indication; and
determining, based on the received UE-side propagation delay compensation indication, whether to perform UE-side TA-based propagation delay compensation for reference time information (RTI);
wherein the UE-side propagation delay compensation indication indicates whether the UE-side TA-based propagation delay compensation is activated.

2. The time synchronization method of claim 1, wherein the preamble is transmitted based on a predetermined or previously acquired timing advance (TA).

3. The time synchronization method of claim 1, wherein the preamble is used for a non-contention based RACH procedure during an RRC_CONNECTED state of the UE.

4. The time synchronization method of claim 1, wherein the synchronization-specific downlink signal comprises a propagation-delay-related value of a specific value granularity, and the specific value granularity comprises one of a plurality of propagation-delay-related value granularities supported by the UE.

5. The time synchronization method of claim 4, wherein the synchronization-specific downlink signal is transmitted in a random access response (RAR) or a medium access control (MAC) control element (CE).

6. The time synchronization method of claim 4, wherein the propagation-delay-related value comprises a value of timing advance (TA), and the specific value granularity comprises a granularity of timing advance (TA).

7. The time synchronization method of claim 6, wherein the specific value granularity is selected from the plurality of propagation-delay-related value granularities based on TA content preference received from the UE or based on a synchronization requirement of a time sensitive communication (TSC) traffic.

8. The time synchronization method of claim 1, wherein the synchronization-specific downlink signal comprises a type of timing advance associated with a source of reference time information (RTI) or associated with a time sensitive communication (TSC) traffic type.

9. The time synchronization method of claim 1, further comprising:
transmitting another synchronization-specific uplink signal synchronization-specific uplink signal comprises a request for provision or update of a propagation-delay-related value or reference time information (RTI), and the propagation-delay-related value comprises a value of at least one of timing advance (TA) or propagation delay (PD).

10. The time synchronization method of claim 9, further comprising:
sending a request for a single shot RTI delivery in addition to periodic reporting of the RTI;
sending a request to indicate or update granularity of the RTI;
sending a request to indicate or update periodicity of periodic reporting of RTI; or
sending a request to indicate or update the RTI type of a corresponding traffic type.

11. The time synchronization method of claim 9, further comprising:
sending a request to indicate or update periodicity or position of a downlink synchronization signal block (SSB), DMRS, or CSI-RS; or
sending a request to indicate or update granularity of the TA or the propagation-delay-related value.

12. The time synchronization method of claim 1, further comprising:
transmitting another synchronization-specific uplink signal in response to a TA validity event generated based on a TA validity condition.

13. The time synchronization method of claim 12, wherein the another synchronization-specific uplink signal comprises a preamble, a sounding reference signal (SRS) or an uplink DMRS signal for propagation-delay-related signaling, and is transmitted based on a predetermined or previously acquired timing advance (TA) or propagation delay (PD).

14. The time synchronization method of claim 12, wherein the TA validity condition is predefined or received from a system information block (SIB), a medium access control (MAC) control element (CE), or a radio resource control (RRC) signal.

15. The time synchronization method of claim 12, wherein the TA validity condition comprises at least one of a location of the UE, a beam direction, received signal strength, and a predetermined period of time.

16. The time synchronization method of claim 15, wherein the predetermined period of time comprises a time duration of a discontinuous reception (DRX) cycle.

17. The time synchronization method of claim 1, wherein the UE-side propagation delay compensation indication is transmitted in a radio resource control (RRC) signal.

18. The time synchronization method of claim 17, wherein the radio resource control (RRC) signal comprises a DLInformationTransfer message.

19. The time synchronization method of claim 1, wherein whether to perform the UE-side TA-based propagation delay compensation for RTI is determined based on whether propagation delay pre-compensation for RTI has been performed by serving base station.

20. The time synchronization method of claim 19, wherein whether the propagation delay pre-compensation for RTI has been performed is determined based on whether the UE-side TA-based propagation delay compensation is deactivated.

21. The time synchronization method of claim 19, further comprising:
performing UE-side TA-based propagation delay compensation when the propagation delay pre-compensation has not been performed.

22. The time synchronization method of claim 1, further comprising:
performing the UE-side TA-based propagation delay compensation based on a PD compensation triggering condition.

23. The time synchronization method of claim 22, wherein the PD compensation triggering condition comprises a range or a threshold of TA, a subcarrier spacing (SCS), a range or a threshold of received signal strength, a geographic location, or a beam direction.

24. The time synchronization method of claim 22, wherein the PD compensation triggering condition is received from a system information block (SIB), a medium access control (MAC) control element (CE), or a radio resource control (RRC) signal.

25. A user equipment (UE) comprising:
a processor configured to call and run a computer program stored in a memory, to cause a device in which the processor is installed to execute the method of claim 1.

26. A chip, comprising:
a processor, configured to call and run a computer program stored in a memory, to cause a device in which the chip is installed to execute the method of claim 1.

27. A non-transitory computer-readable storage medium, in which a computer program is stored, wherein the computer program causes a computer to execute the method of claim 1.

28. A time synchronization method executable in a base station, comprising:
receiving a synchronization-specific uplink signal, wherein the synchronization-specific uplink signal comprises a preamble for propagation-delay-related signaling, the propagation-delay-related signaling is associated with timing advance (TA) between a user equipment (UE) and the base station serving the UE;
transmitting a synchronization-specific downlink signal in response to the synchronization-specific uplink signal; and
transmitting a UE-side propagation delay compensation indication, wherein the UE-side propagation delay compensation indication indicates whether the UE-side TA-based propagation delay compensation for reference time information (RTI) is activated.

29. The time synchronization method of claim 28, wherein the preamble is transmitted based on a predetermined or previously acquired timing advance (TA).

30. The time synchronization method of claim 28, wherein the preamble is used for a non-contention based RACH procedure.

31. The time synchronization method of claim 28, wherein the synchronization-specific downlink signal comprises a propagation-delay-related value of a specific value granularity, and the specific value granularity comprises one of a plurality of propagation-delay-related value granularities supported by a UE.

32. The time synchronization method of claim 31, wherein the synchronization-specific downlink signal is transmitted in a random access response (RAR) or a medium access control (MAC) control element (CE).

33. The time synchronization method of claim 31, wherein the propagation-delay-related value comprises a value of timing advance (TA), and the specific value granularity comprises a granularity of timing advance (TA).

34. The time synchronization method of claim 33, wherein the specific value granularity is selected from the plurality of propagation-delay-related value granularities based on TA content preference received from the UE or based on a synchronization requirement of a time sensitive communication (TSC) traffic.

35. The time synchronization method of claim 28, wherein the synchronization-specific downlink signal comprises a type of timing advance associated with a source of reference time information (RTI) or associated with a time sensitive communication (TSC) traffic type.

36. The time synchronization method of claim 28, further comprising:
receiving another synchronization-specific uplink signal synchronization-specific uplink signal comprises a request for provision or update of a propagation-delay-related value or reference time information (RTI), and the propagation-delay-related value comprises a value of at least one of timing advance (TA) or propagation delay (PD).

37. The time synchronization method of claim 36, further comprising:
   sending a message of RTI in response to a request for RTI;
   sending a message of RTI with granularity in response to a request indicating or updating the granularity of the RTI;
   periodically reporting RTI with periodicity in response to a request indicating or updating the periodicity of periodic reporting of RTI; or
   sending a message of RTI of the RTI type in response to a request indicating or updating the RTI type of a corresponding traffic type.

38. The time synchronization method of claim 36, further comprising:
   providing downlink synchronization signals with periodicity in response to a request for indicating or updating the periodicity or position of the downlink synchronization signals, wherein at least one of the downlink synchronization signals comprise downlink synchronization signal block (SSB), DMRS, or CSI-RS; or
   providing an update of the propagation-delay-related value with updated granularity in response to a request for indicating the updated granularity of the propagation-delay-related value.

39. The time synchronization method of claim 28, further comprising:
   providing a TA validity condition.

40. The time synchronization method of claim 39, wherein the TA validity condition is transmitted in a system information block (SIB), a medium access control (MAC) control element (CE), or a radio resource control (RRC) signal.

41. The time synchronization method of claim 39, wherein the TA validity condition comprises at least one of a UE location, a beam direction, received signal strength, and a predetermined period of time.

42. The time synchronization method of claim 41, wherein the predetermined period of time comprises a time duration of a discontinuous reception (DRX) cycle.

43. The time synchronization method of claim 28, wherein the UE-side propagation delay compensation indication is transmitted in a radio resource control (RRC) signal.

44. The time synchronization method of claim 43, wherein the radio resource control (RRC) signal comprises a DLInformationTransfer message.

45. The time synchronization method of claim 28, wherein the UE-side TA-based propagation delay compensation for RTI is deactivated if propagation delay pre-compensation for RTI has been performed by the base station.

46. The time synchronization method of claim 28, further comprising:
   transmitting a PD compensation triggering condition to a UE.

47. The time synchronization method of claim 46, wherein the PD compensation triggering condition comprises a range or a threshold of TA, a subcarrier spacing (SCS), a range or a threshold of received signal strength, a geographic location, or a beam direction.

48. The time synchronization method of claim 46, wherein the PD compensation triggering condition is transmitted in a system information block (SIB), a medium access control (MAC) control element (CE), or a radio resource control (RRC) signal.

49. A base station comprising:
   a processor configured to call and run a computer program stored in a memory, to cause a device in which the processor is installed to execute the method of claim 28.

50. A chip, comprising:
   a processor configured to call and run a computer program stored in a memory, to cause a device in which the chip is installed to execute the method of claim 28.

51. A non-transitory computer-readable storage medium, in which a computer program is stored, wherein the computer program causes a computer to execute the method of claim 28.

* * * * *